Feb. 17, 1942.   H. S. BARNHART   2,273,555
CAMERA CONSTRUCTION
Filed July 22, 1939

HERBERT S. BARNHART
INVENTOR.
BY Philip S. Hopkins
William C. Babcock
ATTORNEYS

Patented Feb. 17, 1942

2,273,555

UNITED STATES PATENT OFFICE 2,273,555

CAMERA CONSTRUCTION

Herbert S. Barnhart, New York, N. Y., assignor, by mesne assignments, to General Aniline & Film Corporation, New York, N. Y., a corporation of Delaware Application July 22, 1939, Serial No. 285,883

2 Claims. (Cl. 95—45)

My invention relates to a new form of camera construction, more particularly to a camera of the folding or telescoping front type. It is well known in the art that cameras may be provided with a lens and lens carrying member which may be extended from the camera casing to a desired operative position for the taking of pictures, depending on the focal length of the lens used, and which may be retracted to a position adjacent the camera casing when the camera is not in use.

Most such devices, however, must be placed in position by taking hold of finger pieces on the extension and drawing said extension manually into position. Similarly, for retracting the lens, it is usually necessary to release one or more spring members or lever arms which maintain the lens carrying member in its extended position. Such an arrangement is obviously inconvenient for the operator and requires manipulation at certain definite, and usually small, operating points.

With disadvantages of the prior forms of construction in view, one object of my invention is to provide a form of camera construction in which the lens carrying member may be extended and retracted by rotation of a larger and more accessible operating member on the camera casing.

A further object is to provide such a camera in which the operating member for extension and retraction of the camera front is the camera view finder.

Another object is to provide a camera in which the view finder is rotatable from a position out of alignment with the optical axis of the camera to an operative position in alignment with said axis, to extend the camera front to operative position.

Further objects and advantages will be apparent from the following specification.

These objects are accomplished by employing the general construction, a preferred form of which is shown in the accompanying drawing and description, wherein like reference characters indicate like parts. In the drawing, Fig. 1 is a top view of a camera employing my novel form of construction with the lens carrying member in its retracted position, and with the view finder out of alignment with the optical axis of the camera.

The following detailed and concise description of my invention is given in order that those skilled in the art may more fully and completely understand the nature, scope and application thereof.

Figure 1:
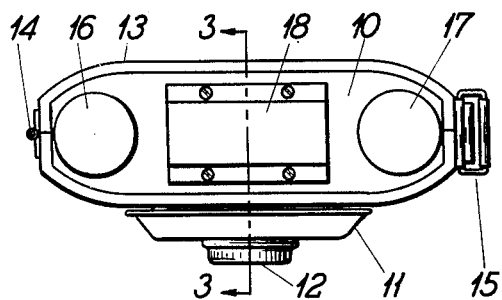
Figure 2:
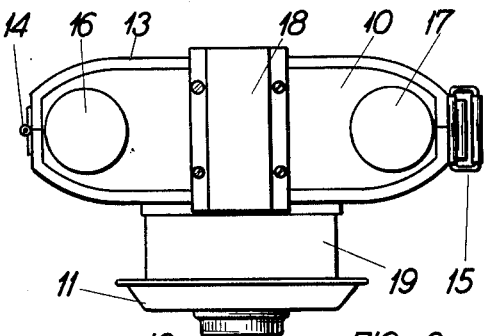
Fig. 2 is a similar view of the camera with the camera front extended, and the view finder in operative alignment.

With reference to Figs. 1 and 2, the camera casing 10 is provided with a movable lens carrying member or camera front 11 on which is mounted the lens 12. This camera front may be extended and retracted, as will be described below. The casing 10 is further provided with the camera back 13 hinged to the casing at 14. The customary handle 15 and film winding knobs 16 and 17 may be provided, as shown.

On the camera casing is mounted a view finder 18 which is shown in Fig. 2 in its operative position in alignment with the optical axis of the camera. As shown in the drawing, this finder member may be rotated from said aligned position to the position shown in Fig. 1, and vice versa.

The camera front 11 is provided with the sleeve or casing member 19 adapted to slide in a telescoping manner in and out of the double walled shell 20—21 in the camera casing, as is described and claimed in application Serial No. 262,714, filed March 18, 1939, by Lessler and Polhemus. This shell consists of an inner wall 21 and outer wall 20 which are overlappingly joined at 22 to form the focal plane supporting surface and exposure frame for the film, as claimed in the mentioned application.

The sleeve or casing member 19 may be provided with an inner mask and lining member 23, which is adapted to control the maximum amount of light reaching the focal plane of the camera, and which also carries flanges to assist in the exclusion of light from the camera interior, as also claimed in the above application.

Figure 5:
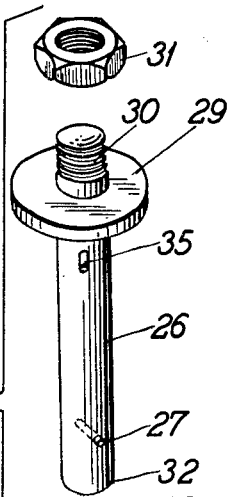
Fig. 5 is an exploded view (in brackets) of a portion of the connecting mechanism shown in Fig. 3.

The sleeve or casing member is provided with a slot 24 in which a cam member 25 is operative. This cam member 25 is operatively connected to the shaft 26, as, for example, by means of the pin 27 and slots 28 (see Figs. 4 and 5). The other end of the shaft 26 is fastened to the view finder 18 by any desired construction, as, for example, the shoulder 29 and nut 31, adapted to engage the screw threads 30 and clamp the finder tightly to the shaft. The lower end 32 of the shaft 26 may be supported in the camera casing by the bearing 33 in the inner wall 21. The upper end of said axle is rotatably mounted in the top wall of the casing as shown in Fig. 3, and is maintained in position on the one hand by the flange 29 and on the other by the pin 35 which projects on the rear side of the axle in the same way that it appears on the front in Fig. 5.

Figure 3:
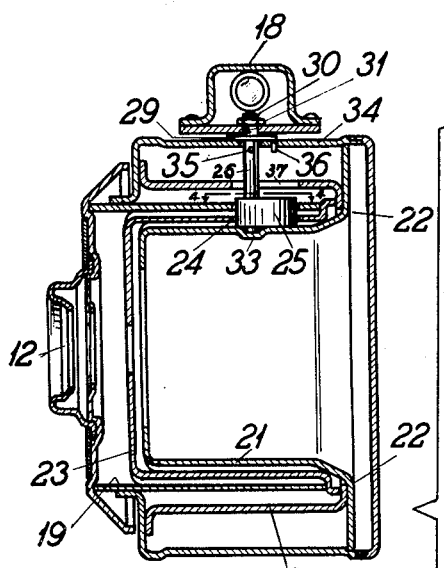
Fig. 3 is a sectional view on the line 3—3 of Fig. 1, and shows one form of connection between the view finder and lens carrying member.

With reference to Fig. 3, the rotary movement of the shaft 26 is limited by one or more stops or pins 36 which engage the pin 35 on the shaft. To facilitate the assembly and removal of the device, the outer wall 20 of the casing may be provided with a slot 37 through which the cam member 25 may be passed.

Figure 4:
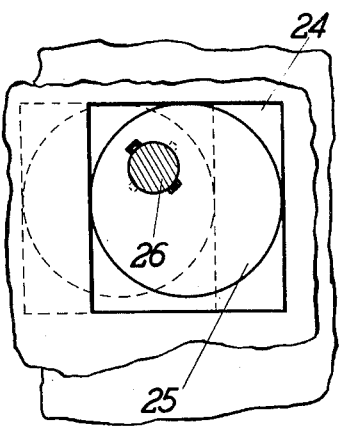
Fig. 4 is a sectional view on the line 4—4 of Fig. 3 showing further details of the connection.

As will be seen from Fig. 4, I have shown a form of cam which is circular in cross-section and is of the eccentric type. This cam operates through a total arc of 90 degrees in the construction shown, and is thereby adapted to move the camera front the desired distance outwardly or inwardly as the view finder is moved through a corresponding arc into and out of alignment with the optical axis of the camera. Thus I have provided a new form of camera construction which is compact, economical, and efficient.

It will also be apparent that the nature of my new form of construction permits the use of a much longer view finder than is ordinarily practical in small folding cameras. The increased distance between the view finder lenses has obvious advantages from the optical standpoint. Since the finder is aligned with the longer axis of the camera body, when the front is retracted, these optical advantages are attained without sacrificing desirable compactness and smoothness of design.

Many obviously equivalent forms of construction will be readily apparent to those skilled in the art. Thus, for example, any known mechanically operative connection between the lens carrying member or its sleeve or casing member and the view finder may be employed without departing from the essential inventive concept which is exemplified in this specification. My invention is therefore not to be limited in its scope to the exact form of mechanism shown in the drawing, but only by the appended claims.

I claim:

1. A photographic camera having a casing, a view finder member rotatably mounted with respect to one wall of said casing for movement into and out of alignment with the optical axis of the camera, an objective lens on said camera, a supporting member for said objective movable between an extended operative position and a retracted position with respect to said casing, and means operatively connecting said finder member and said supporting member for movement of the latter into its extended and retracted positions when said finder member is moved into and out of alignment with the optical axis of the camera, said connecting means comprising a cam operatively connected to said finder member, and corresponding opposed cam surfaces associated with said supporting member.

2. A photographic camera having a casing, an objective lens, a sleeve member supporting said lens, said sleeve being telescopingly mounted in the front of said casing for movement between a relatively extended operative position and a relatively retracted position with reference to the casing, a view finder pivotally mounted on one wall of the camera for rotation into and out of alignment with the optical axis of the camera about an axis perpendicular to said wall, a rotary member directly connected to said finder and rotatable therewith, and means on said telescoping sleeve cooperating directly with said rotary member and positively driven thereby in both directions for translating rotary motion of the finder directly into reciprocating motion of the telescoping sleeve and thereby moving the latter into its extended and retracted positions when said finder is rotated into and out of alignment with the optical axis of the camera.

HERBERT S. BARNHART.